United States Patent [19]
Lim et al.

[11] Patent Number: 6,044,409
[45] Date of Patent: Mar. 28, 2000

[54] FRAMEWORK FOR MARSHALING AND UNMARSHALING ARGUMENT OBJECT REFERENCES

[75] Inventors: Swee Boon Lim, Mountain View; Ken M. Cavanaugh, III, Montara; Anita Jindal, Cupertino, all of Calif.

[73] Assignee: Sun Microsystems, Inc., Palo Alto, Calif.

[21] Appl. No.: 08/670,681

[22] Filed: Jun. 26, 1996

[51] Int. Cl.$^7$ ...................................................... G06F 9/44
[52] U.S. Cl. .......................................... 709/315; 709/330
[58] Field of Search ................................. 395/680, 684; 709/300, 303, 304

[56] References Cited

U.S. PATENT DOCUMENTS

| | | | |
|---|---|---|---|
| 5,307,490 | 4/1994 | Davidson et al. | 395/684 |
| 5,577,251 | 11/1996 | Hamilton et al. | 395/671 |
| 5,737,607 | 4/1998 | Hamilton et al. | 395/701 |
| 5,787,251 | 12/1992 | Hamilton | 395/200.33 |

OTHER PUBLICATIONS

Hamilton et al., "Subcontract: A flexible base for distributed programming", ACM, pp. 69–79, 1993.

*Primary Examiner*—Majid A. Banankhah
*Assistant Examiner*—St. John Courtenay, III
*Attorney, Agent, or Firm*—Beyer & Weaver, LLP

[57] ABSTRACT

Methods and devices for reducing computing overhead in a distributed client/server based computing system which utilize an efficient framework for marshaling and unmarshaling argument object references are disclosed. In one aspect of the invention, a method of unmarshaling an argument object reference, which includes a subcontract identifier, that is a part of an argument encapsulated within a marshal buffer involves identifying the subcontract identifier associated with the argument object reference, using the identified subcontract identifier to identify an appropriate associated unmarshal method, and calling the associated unmarshal method. In another aspect of the invention, a method of marshaling an argument object reference, which includes a subcontract identifier, that is a part of an argument encapsulated within a marshal buffer involves invoking a marshal method of a client representation in the argument object reference passing the marshal buffer as an argument to the marshal method.

16 Claims, 11 Drawing Sheets

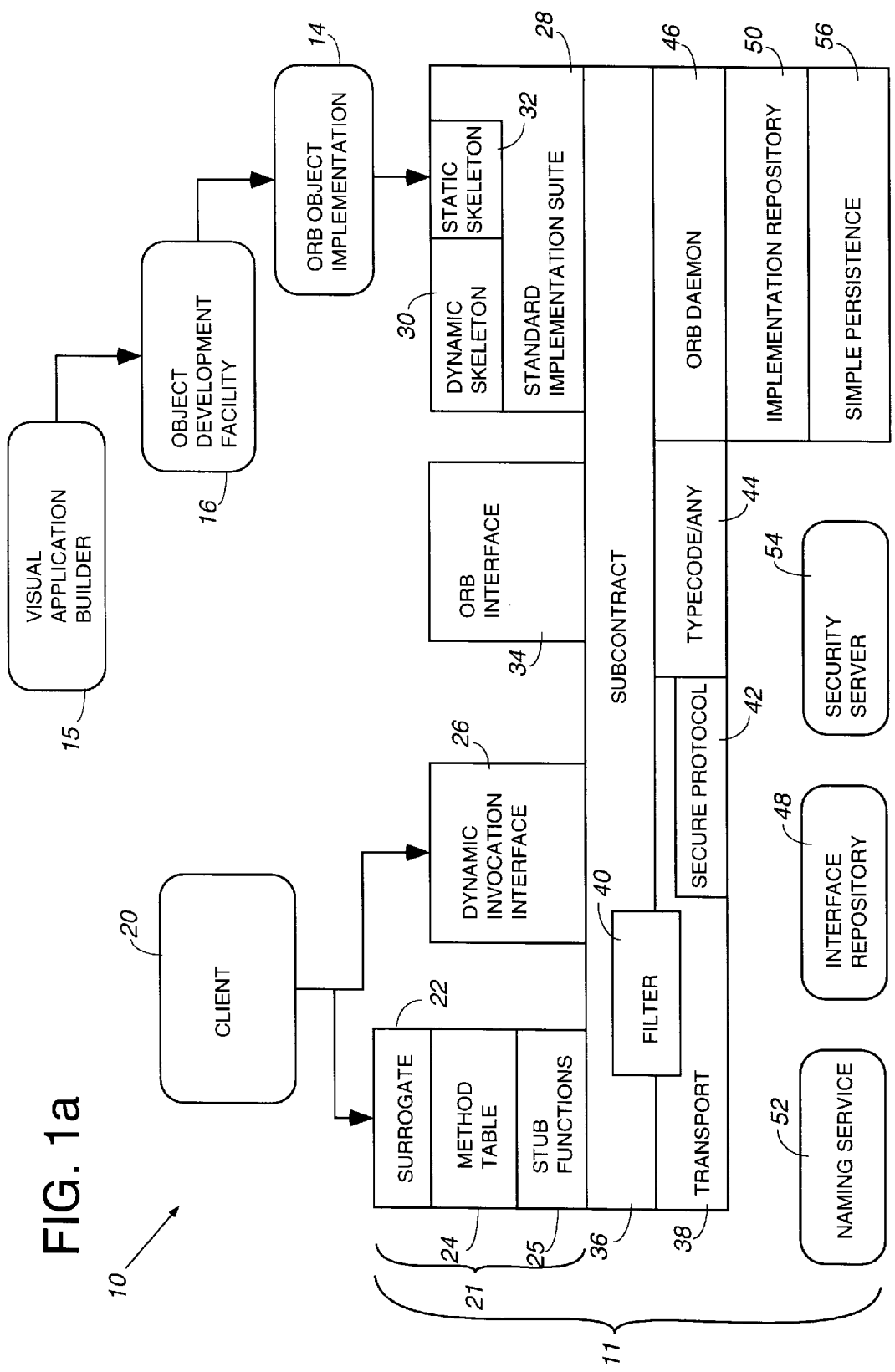

6,044,409

FRAMEWORK FOR MARSHALING AND UNMARSHALING ARGUMENT OBJECT REFERENCES

CROSS REFERENCE TO RELATED APPLICATIONS

U.S. patent Ser. No. 08/554,794, entitled "Method and Apparatus for SubContracts in Distributed Processing Systems," filed Nov. 7, 1995 as a continuation to Ser. No. 07/995,863, filed Dec. 21, 1992 (now abandoned), is related to the present application and is incorporated by reference herein in its entirety. Additionally, the following U.S. patent applications, all filed concurrently herewith, are related to the present application and are also incorporated by reference herein in their entirety: application Ser. No. 08/670,682; application Ser. No. 08/670,684; application Ser. No. 08/673,181; application Ser. No. 08/670,700; and application Ser. No. 08/669,782.

BACKGROUND OF THE INVENTION

1. Field of Invention

The present invention relates to the fields of distributed computing systems, client-server computing, and object-oriented programming. More particularly, the invention relates to methods and devices for marshaling and unmarshaling argument object references to facilitate servant invocation.

2. Description of Prior Art

A computing environment in which objects located on different computers are linked by a network is typically referred to as a client-server computing environment. Some of the computers act as providers of services or functionality to other computers. Others of the computers act as consumers of services or functionalities. The providers of service or functionality are known as "servers", and the consumers of the service or functionality are called "clients". The client-server model may also be generalized to the case where distinct programs running on the same computer are communicating with one another through some protected mechanism and are acting as providers and consumers of service or functionality.

Attempts to provide such a distributed system have been made using objectoriented methodologies that are based upon a client-server model in which server objects, often referred to as servants, provide interfaces to client objects that make requests of the server objects. Typically, in such a distributed system, the servants are objects which include data and associated methods. The client objects obtain access to the functionalities of the server objects by executing calls on them, which calls are mediated by the distributed system. When the server object receives a call, it executes the appropriate method and transmits the result back to the client object. The client object and server object communicate through an Object Request Broker (ORB) which is used to locate the various distributed objects and to establish communications between objects. Distributed objects may exist anywhere in a network, as for example in the address space of the client, in multiple address spaces on the client machine, and in multiple machines across the network.

The software industry has responded to the need for a distributed object technology by forming the Object Management Group (OMG). The goal of the OMG is to define the Object Management Architecture (OMA), which has four major components: the Object Request Broker (ORB), Object Services, Common Facilities, and Application Objects. The Object Request Broker provides basic object communications and management services, thereby forming the basis of a distributed object system. A standard for an Object Request Broker is contained in the Common Object Request Broker Architecture (CORBA) specification.

In typical client-server systems, performance overhead can be costly. That is, the speed and quality of a process within the system may be compromised by inefficient uses of application code and methods associated with gathering information from the process or with routing information within a process. By way of example, the performance overhead associated with marshaling and unmarshaling object references which are arguments to target object references, is often relatively high. As will be appreciated by those skilled in the art, in order to marshal or unmarshal an object reference, the marshal or unmarshal method which corresponds to the object reference must be identified. By way of example, the marshal and unmarshal functions used to marshal and unmarshal arguments which are simple integers, i.e. arguments that are of the type "integer," will differ from the marshal and unmarshal functions used to handle arguments that are of the type "string," which in turn will differ from the marshal and unmarshal functions used to handle arguments that are of the type "object reference."

The identification of the correct marshal or unmarshal method usually involves a search of all available marshal and unmarshal methods. The performance overhead associated with these searches is typically relatively high. In particular, the performance overhead associated with identifying the marshal and unmarshal methods associated with argument object references is often high due to the fact that the argument object reference must first be identified as being of the type "object reference," and then a search must be made for an appropriate marshal or unmarshal method. In a distributed object system which utilizes a variety of different transport mechanisms and protocols, there will typically be many encoding formats, i.e. marshal methods, for use in encoding object references. Similarly, there may be many decoding formats, i.e. unmarshal methods, for use in decoding encoded object references. As such, a search for an appropriate marshal and unmarshal methods may very likely require a relatively high amount of computing overhead. High performance overhead often results in an inefficient use of system resources. Consequently, the provision of methods and devices which would reduce the performance overhead associated with marshaling and unmarshaling argument object references is desirable.

SUMMARY OF THE INVENTION

To achieve the foregoing and other objects and in accordance with the purpose of the present invention, methods and devices for reducing computing overhead by utilizing an efficient framework for marshaling and unmarshaling argument object references in a distributed client/server based computing system are disclosed. In one aspect of the invention, a method of unmarshaling an argument object reference, which includes a subcontract identifier, that is a part of an argument object reference encapsulated within a marshal buffer is disclosed. The marshal buffer provides the ability to identify the subcontract identifier embedded in an argument object reference encapsulated within the marshal buffer. The identified subcontract is then used to identify an associated unmarshal method. Once an appropriate unmarshal method is identified, the appropriate unmarshal method is called.

In one preferred embodiment, the detected subcontract identifier is compared to an expected subcontract identifier.

When it is determined that the identified subcontract identifier is the same as the expected subcontract identifier, predefined expected unmarshal method that corresponds to the expected subcontract identifier is called. When the identified subcontract identifier is not the same as the expected subcontract identifier, a subcontract registry is accessed in order to identify the appropriate unmarshal method.

In another aspect of the invention, a method of marshaling an argument object reference is disclosed. This is accomplished by invoking a marshal method of a client representation identified in the argument object reference and passing the desired marshal buffer as an argument to the marshal method. A client representation represents an ORB object and implements the client side functionality and features of the subcontract associated with the object, including marshaling an object reference to the object as an argument. If the subcontract identified by the subcontract identifier in the argument object reference is known, the argument object reference is encoded into a form appropriate for the identified marshal buffer type. In some embodiments, if the argument object reference may be encoded into a form appropriate for an identified marshal buffer type, the marshal method marshals the argument object reference into the marshal buffer.

BRIEF DESCRIPTION OF THE DRAWINGS

The invention, together with further advantages thereof, may best be understood by reference to the following description taken in conjunction with the accompanying drawings in which:

FIG. 1a is a symbolic overview of a distributed object system suitable for implementing the present invention.

DETAILED DESCRIPTION OF THE INVENTION

Figure 1B:
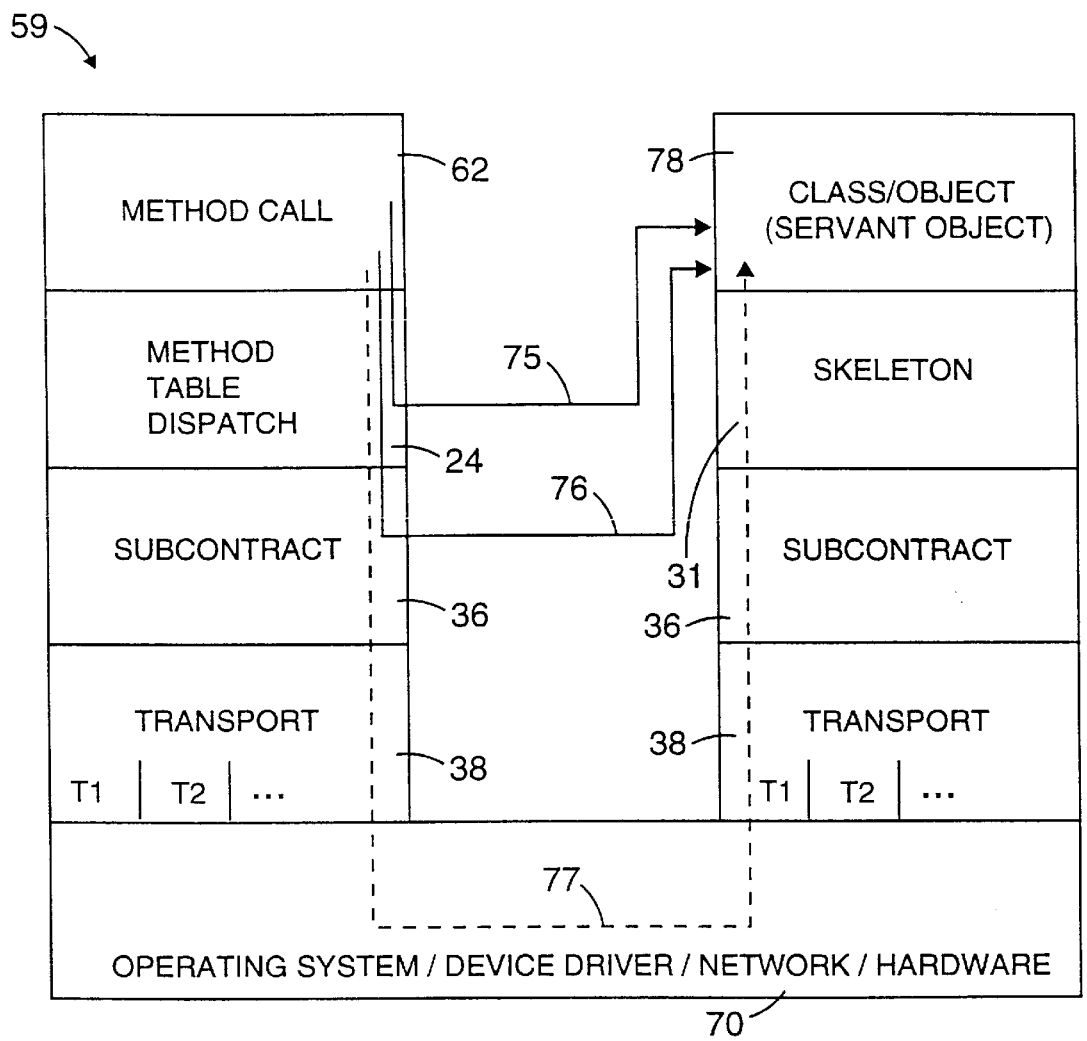
FIG. 1b is a diagrammatic illustration which represents how a request by a client is routed through the architecture of a client side and a server side of a distributed object system, and the interface between the client side and the server side of the distributed object system.
Figure 1C:
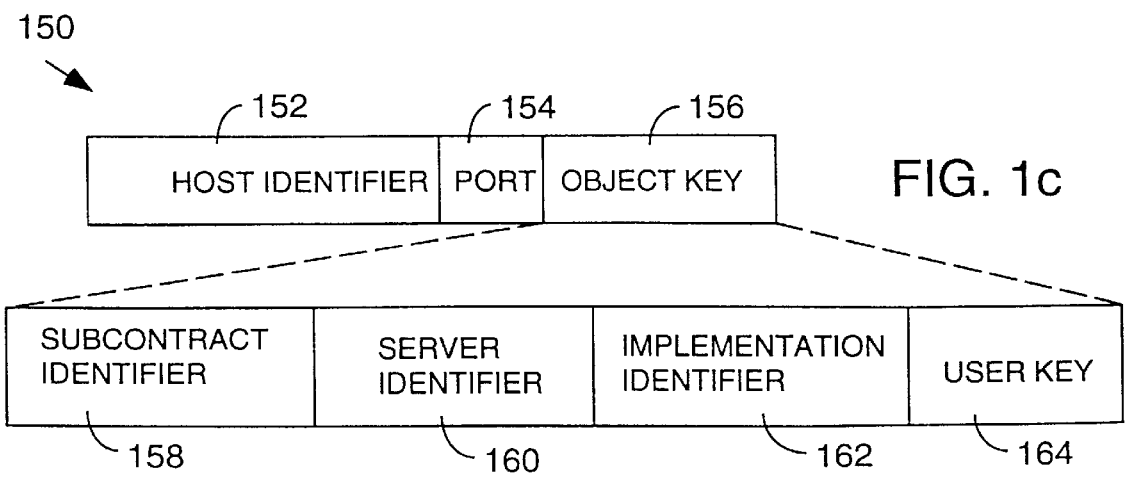
FIG. 1c is a diagrammatic representation of data fields present in an object reference suitable for use in inter-process invocations in accordance with one embodiment of the present invention.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, the present invention will be described primarily within the context of an Object Request Broker (ORB) implemented under the CORBA specification from the OMG, Revision 2.0, dated July 1995, which is incorporated herein by reference. FIG. 1a diagrammatically illustrates the overall architecture of a representative distributed object system suitable for implementing the present invention. FIG. 1b diagrammatically illustrates some possible flow paths that a request from a client to a servant object may follow within such an architecture that includes a three level dispatch mechanism. FIG. 1c shows one object reference data structure that may be used by a client to refer to a servant object.

A distributed object system 10 typically includes an Object Request Broker (ORB) 11 as is symbolically illustrated in FIG. 1a. ORB 11 provides all of the location and transport mechanisms and facilities necessary to deliver a call from a client to a servant (target object) and to return a response to the client, as will be discussed below with reference to FIG. 1b. The client and servant may be located in the same process, in different processes on the same machine, or on completely different machines. For the purposes of this discussion, client 20 may be any code that invokes an operation on a distributed object and thus may or may not take the form of distributed object or a process. Normal object implementation 14 is a representation of an object type defined in a traditional object programming language, such as C++. A wide variety of representations are possible. By way of example, an object implementation 14 may be a simple C++ object type that has been provided by an application developer. Alternatively, an implementation for an object type may be developed within a visual application builder 15. This visual application builder allows a developer to visually select existing object types from a catalog and graphically connect the services provided by one object to the services needed by another (attributes, arguments, etc.) in order to create a new implementation for an object type.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24, and a stub function 25. Client 20 communicates initially with surrogate 22 which appears to the client as the server object. Alternatively, client 20 may communicate directly with the server object through a dynamic invocation interface (DII) 26 instead of through surrogate 22, method table 24, and stub function 25. Dynamic invocation interface 26 is used to enable clients, as for example client 20, to construct dynamic requests. One procedure by which a client makes a call to a servant utilizing the above layers is described in more detail below with reference to FIG. 1b.

Subcontract layer 36 provides the functionality required by an object in order to utilize subcontracts to implement various services (or features or object mechanisms) named by a particular subcontract, as described in greater detail in above-referenced U.S. patent application Ser. No. 08/554,794, filed Nov. 7, 1995. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in above-referenced U.S. patent application Ser. No. 08/670,682. Filter 40, if being used, may perform a variety of tasks, such as compression, encryption, tracing, or debugging, which are to be applied to communications to and from an object.

Transport layer 38 operates to marshal, unmarshal and physically transport information to and from a servant that typically does not share the same process as a client. Mechanisms for marshaling and unmarshaling are described in above-referenced U.S. patent application Ser. No. 08,673,181.

A standard implementation suite 28 (or object adapter) represents a set of subcontracts that interact with ORB objects 14 in identical ways, as for example object key management. One such implementation suite is described in above-referenced U.S. patent application Ser. No. 08/669,782. It should be duly noted that a subcontract may belong to multiple implementation suites. Hence, other implementation suites that utilize different subcontracts are possible. A skeleton, which may take the form of either static skeleton 32 or dynamic skeleton 30 is used to transform requests into a format required by a servant object 14. Thus, skeletons 32, 30 call an appropriate servant object 14. Static skeleton 32 is used to call interface-specific object implementations 14, while dynamic skeleton 30 is used generically when interface-specific objects are not available.

An ORB Daemon 46 is responsible for ensuring that object servers are active when invoked by clients. A technique for starting object servers is disclosed in U.S. patent application Ser. No. 08/408,645 which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between process on the same machine. The security server 54 is a security administration server that secures the services that are used between processes on different computers.

Typecode/Any module 44 implements typecode and "Any" objects. Typecode describes an Interface Definition Language (IDL) data type, allowing type descriptions to be transmitted between clients and servers. An instance of an IDL data type may be encapsulated by an "Any" object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A name server 52 is used to name ORB objects. A client, as for example client 20, may use name server 52 to find a desired object by name. Name server 52 returns an object reference, which in turn may be used to send requests to that object. An Interface Repository 48 (IFR) knows about all interfaces for all objects within the distributed object system.

A request made by a client using a method table ("m-table") dispatch will pass through a variety of the aforementioned layers of the architecture on its way to the servant as diagrammatically illustrated in FIG. 1b. The request is initiated by a client and may take any suitable form. The form of the request will depend to a large extent upon the nature of the programming language used to create the client. By way of example, if the client is written in the C++ language, the request may take the form of a C++ method call 62. The call is made to a designated object reference taking the form of a surrogate. The surrogate includes methods that comply with the object's interface. As will be appreciated by those skilled in the art, the object reference used at different locations within a distributed object system may vary significantly in appearance. In the embodiment described, the client side object reference is a dual pointer (referred to herein as a "fat pointer"). A fat pointer contains two distinct pointers. A first pointer points to a client representation ("client rep") associated with the referenced object. A second pointer points to a method table of the method table dispatch 24 that is associated with the referenced object. A client representation is an object that has methods which support invocation as well as CORBA defined "pseudo" object reference operations. These operations include, but are not limited to, a duplicate method, a release method, a narrow method, a hash method, and an is equivalent method.

After the client has initiated a call, the call is processed using a method table dispatch mechanism 24. Such a technique is disclosed in U.S. patent application Ser. No. 08/307,929 and is hereby incorporated by reference. The method table dispatch mechanism uses a method table that contains a list of pointers to stub functions 25, one of which is associated with the method to be invoked. Stub functions 25 receive a function or procedure call in the "native" language of the client process, then use either a subcontract layer 36 or a native call to eventually call the corresponding servant object. The native language may be any suitable language, as for example a language such as C++.

Method table dispatch 24 determines the appropriate stub function 25 to process the method call, and then pairs the method call with the appropriate stub function 25. In the event that the client making the method call is in the same process as the servant object, a local stub function is called. The local stub function sends the method call directly to servant object 78. A technique for routing calls within a local process is described in above-referenced U.S. patent application Ser. No. 08/670,684. Alternatively, if the servant object is in a different process, i.e. a remote process, a remote stub function is called. The remote stub function invokes the client representation, which delivers the invocation to servant object 78.

Subcontracts implemented by subcontract layer 36 are logic modules which provide control of the basic mechanisms of object invocation and argument passing that are important in distributed object systems. A subcontract implemented by subcontract layer 36 determines a specific quality of service for use by an object. A subcontract is uniquely identified by a subcontract identifier, which is typically embedded in an object reference. A quality of service is a set of service properties. Among possible service properties which are selectable are qualities relating to server activation, security, transactions, filterability, and clean shut-down. Subcontracts are configured such that certain qualities of service are available. With predetermined qualities of service, the overhead associated with processing individual service properties is reduced. Realistically, only "reasonable" or commonly used combinations of service properties are supported with subcontracts. However, subcontracts may be created to meet the specific requirements of a given distributed object system.

The identification of an appropriate subcontract in subcontract layer 36 may be thought of as the identification of a desired function that is unique to that subcontract. For example, a marshal function or an unmarshal function is defined for each subcontract. A subcontract marshal function is used by a stub to marshal an object reference so that it may be transmitted to another address space, or domain. The object reference is typically processed by a transport mechanism in transport layer 38.

A transport mechanism such as T1, T2, etc., which is a part of the transport layer 38, is used to marshal and physically transport information to and from servant objects. Information, i.e. the object reference or the request, is converted into protocols appropriate to a given domain. By way of example, protocols may include, but are not limited to, Ethernet protocols and internet interoperable protocols (IIOPs). In some uncommon cases, protocols may even entail the use of electronic mail to transmit instructions to be implemented on a server. After information is marshaled, the transport mechanism then transports information through any combination of an operating system, a device driver, or a network, that are all a part of hardware 70 used by the client side of a distributed object system. While transport mechanisms require a conversion of information into a protocol appropriate to a given domain, some transport mechanisms to do not require the encoding of information for different domains. One transport mechanism which does not require a conversion of information into a protocol appropriate to a domain other than the one on which information originates is termed a "door". Doors are essentially gateways between two different processes on the same host. The use of doors eliminates the need for a conversion of information into a canonical implementation in transport layer 38, as there is no need to encode information into a protocol which may be used by a different machine by virtue of the fact that information is remaining on the same host and therefore does not require a change of domain. Hence, information may simply be "flattened out," or marshaled into a stream which is not encoded for use by a different machine, and passed between the two processes on the host.

Once information is transported through hardware 70 used by the client side, the information is then transported to hardware 70 on the server side of a distributed object system. Once information is routed through hardware 70, the server side of a distributed object system invokes a transport mechanism such as T1, T2 etc. to receive information on an end point which is a part of transport layer 38. In the event that an end point is not created by transport layer 38, transport layer 38 provides the functionality needed for the end point to be created by subcontract layer 36. By way of example, a door end point is typically created by subcontract layer 36, while other end points, including network and TCP/IP end points, are typically created by transport layer 38. Regardless of whether end points are created by subcontract layer 36 or transport layer 38, end points "live in," i.e. are a part of, transport layer 38. End points are essentially ports which receive information from a different domain. After an end point in transport layer 38 receives information transported from a different domain, the end point then dispatches the information from transport layer 38 to subcontract layer 36. Subcontract layer 36, or more specifically the subcontract in subcontract layer 36 which receives the information, then dispatches the information to the skeleton and the servant. Such a technique for performing this three-level dispatch is described in above-referenced U.S. patent application Ser. No. 08/670,700.

Subcontract layer 36 provides the functionality to unmarshal at least some of the information it has received. That is, subcontract layer 36 unmarshals at least part of the request. Then, the request is dispatched to a skeleton 31 which transforms the request into an implementation specific format required by servant object 78. The skeleton may either be a static skeleton or a dynamic skeleton as described above.

In general, a remote request must be routed through the client side and the server side as described above. The method call 62 is received, method table dispatch layer 24 is used to identify an appropriate subcontract prior to the selection of a transport mechanism in transport layer 38 which marshals the request and prepares it for transport to another domain. Through hardware 70, the marshaled request is transported to the server side where it is received on an end point which is a part of transport layer 38. An appropriate end point receives information transported across a wire, and information is dispatched from transport layer 38 to subcontract layer 36, which provides the functionality to at least partially unmarshal the information it has received. The subcontract then dispatches the request to skeleton 31 which transforms the request into a specific format required by servant object 78. This path is shown by arrow 77, and is the path which may be taken by both remote and local requests.

However, if a client and a server are in a local process, i.e. both the client and the server are in the same process, the use of the path shown by arrow 77 as described above is unnecessarily complex. If it is known that the client and the server are in the same process, it is possible to shorten the invocation, or flow, path of a request for service. If a local process may be identified when an object reference is created, shortened flow paths, i.e. the paths represented by arrows 75 and 76, may be taken to send a request from what is a client to a server which are on the same host. The path represented by arrow 76 is more likely to be taken, as it uses subcontract layer 36 to identify an appropriate subcontract. However, in situations in which an appropriate subcontract does not need to be explicitly identified, the path represented by arrow 75 may be taken.

FIG. 1c will now be used to describe an embodiment of an object reference. As will be familiar to those skilled in the art, object references may take a variety of forms depending upon the location within the process that they are being held at any given time. However, by way of background, a representative object reference for use in a system which utilizes a low overhead object adapter is illustrated in FIG. 1c. In the implementation shown therein, object reference 150 includes a host identifier 152, a port designation 154, and an object key 156. Object key 156 includes a subcontract identifier 158, a server identifier 160, an implementation identifier 162, and a user key 164. Host identifier 152 denotes a particular computer in a network, while port designation 154 identifies the port of the selected computer which is to be used for communication. Object key 156 provides further identifying information used in order to locate a desired servant object on its host machine.

Server identifier 160 names a particular process or program in which the servant object resides, while user key 164 is a unique number or string used to locate the servant within the process named by server identifier 160. Subcontract identifier 158 is used to attach the protocol of a particular subcontract and its associated services with a servant, and implementation identifier 162 names an implementation of an interface that is to be used with that servant object.

As will be appreciated by those skilled in the art, when passing calls to distinct processes, it is necessary to identify marshal functions to use in order to encode each of the elements of the call for transfer to a different domain. As pointed out above, the marshaling function used to marshal an object reference is dependent upon the type of the object reference. Similarly, when receiving object references from distinct processes, it is necessary to identify unmarshal functions to use in order to decode object references received from a different domain. Different types of object references are commonly associated with different types of marshal and unmarshal functions. By way of example, the marshal and unmarshal functions used to marshal and unmarshal arguments which are simple integers, i.e. arguments of type "integer," will differ from the marshal and unmarshal functions used to handle strings, i.e. arguments of type "string." Likewise, the marshal and unmarshal functions used to handle arguments that are of the type string will be different from the marshal and unmarshal functions used to handle arrays, etc.

Maintaining the overhead associated with performing operations in a distributed object-oriented system, i.e. a distributed operating environment, at a relatively lower level without compromising the performance of the system is an important design goal in order to provide a decent level of overall efficiency in the system. One way to reduce the overhead associated with performing operations is to eliminate the need to search all types of marshal or unmarshal functions to find the appropriate function to use in order to marshal or unmarshal, respectively, an object reference which is passed as an argument to a target object reference.

By using the marshal method of the client representation associated with the argument object reference, a global search for an appropriate marshal method may be avoided. Hence, the performance overhead associated with a search for a marshal method may be reduced, if not eliminated. In the distributed object-oriented system described above with respect to FIG. 1a, the use of subcontracts makes it possible to reduce the performance overhead associated with identifying the appropriate unmarshal method to use to unmarshal an argument object reference, as each subcontract has an unmarshal method with which it is associated. By identifying the subcontract associated with the argument object reference, the appropriate unmarshal method for use in unmarshaling the argument object reference may be explicitly identified. In general, the overall efficiency of a distributed object-oriented system may be improved by invoking a marshaling and unmarshaling framework which reduces the performance overhead associated with searching for marshal and unmarshal methods for use in marshaling and unmarshaling, respectively, argument object references.

Figure 2:
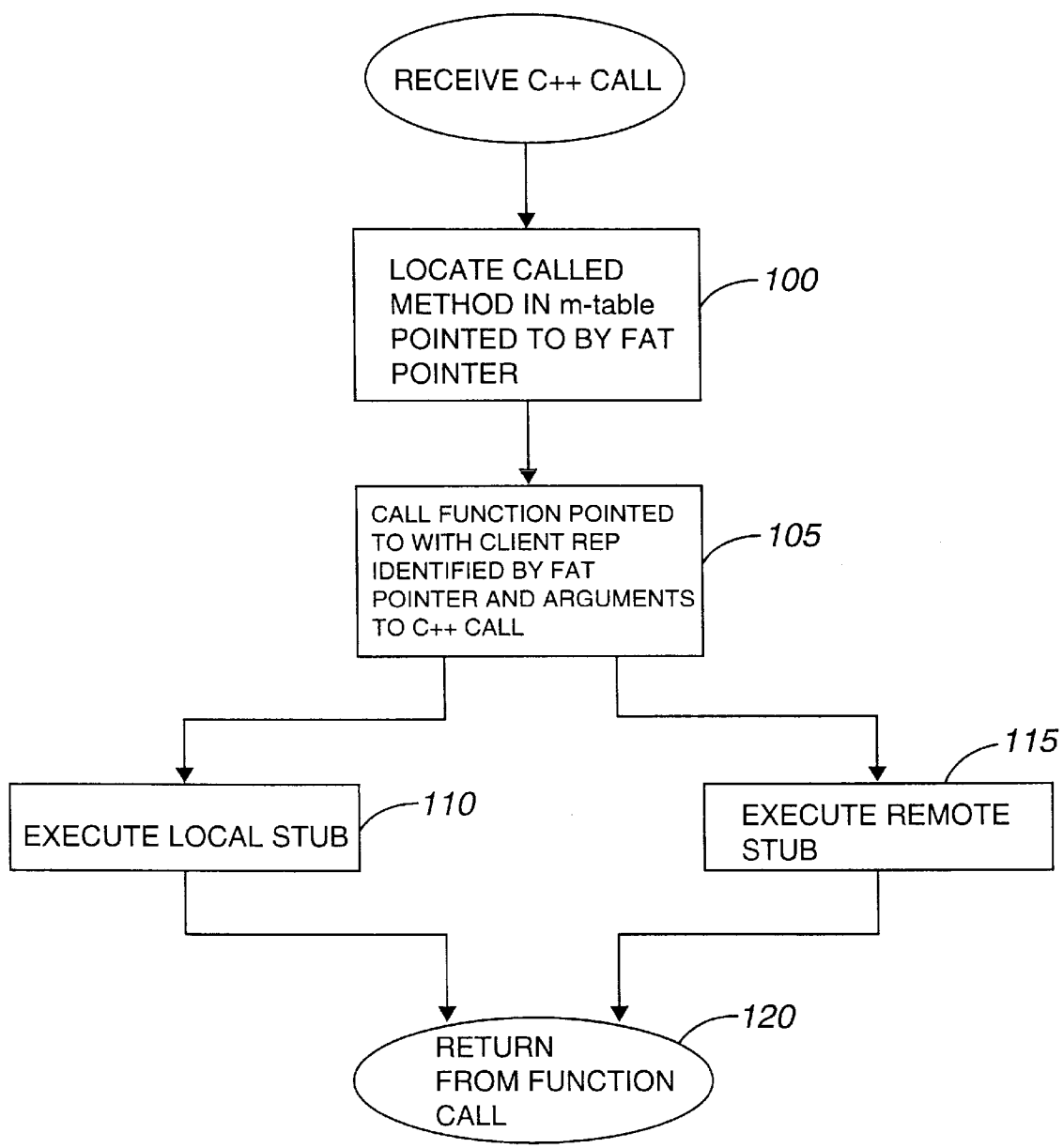
FIG. 2 is a process flow diagram which illustrates a method of invoking an object in accordance with one embodiment of the present invention.

Referring next to FIG. 2, a method of invoking an object in accordance with one embodiment of the present invention will be described. That is, the steps which occur once a call is made to an invoke method are shown in the diagram. Initially, a call or a request, which uses an object reference, is received by a client. Although the call may be in any suitable computer language, in the described embodiment, the call is a C++ call. The object reference in the described embodiment is a fat pointer. A fat pointer may be thought of as a "large" pointer, or a pointer structure, which contains at least two "normal" pointers. A fat pointer may also be considered to be a CORBA object reference. In a fat pointer with two "normal" pointers, the fat pointer typically contains eight bytes, while the normal pointers typically contain four bytes each. The fat pointer is comprised of a representation pointer "rep" and a method table, or m-table, pointer, each of which is a normal pointer. The representation pointer points to a client representation, or client "rep", and may be considered to be a pointer to a subcontract object that represents the servant object on the client. The subcontract object provides the features and functionality required to invoke the servant from the client. It should be appreciated that a client representation represents an ORB object and may be used to implement the client-side functionality and features of the subcontract associated with the object, including such functions as marshaling an object reference to the object as an argument.

In step 100, the called method is located in the m-table pointed to by the fat pointer. If the called method is a local method, then the m-table pointed to by the fat pointer is a local m-table. Similarly, if the called method is a remote method, then the m-table pointed to by the fat pointer is a remote m-table. In step 105, a call to the function pointed to with the client representation identified by the object reference (a fat pointer in the described embodiment) and arguments to the call is made. After the function is called, process control branches off to different functions depending upon whether the function pointed to is in a local process or a remote process. If the function pointed to is in a local process, process control proceeds to step 110 in which a local stub function is executed. Herein, the term "local stub" will be used to refer to a "local stub function," while the term "remote stub" will be used to refer to a "remote stub function." The steps associated with executing a local stub are discussed in detail in co-pending patent application Ser. No. 08/670,684 filed concurrently herewith. After the local stub has been executed in step 110, the process returns from the function call in step 120. If the function pointed to by the fat pointer is in a remote process and not in a local process, process control advances to step 115 after the function is called in step 105. In step 115, a remote stub is executed. The process of executing a remote stub will be discussed in more detail below. After the remote stub has been executed in step 115, process control proceeds to step 120, which is the return from the function call.

Figure 3:
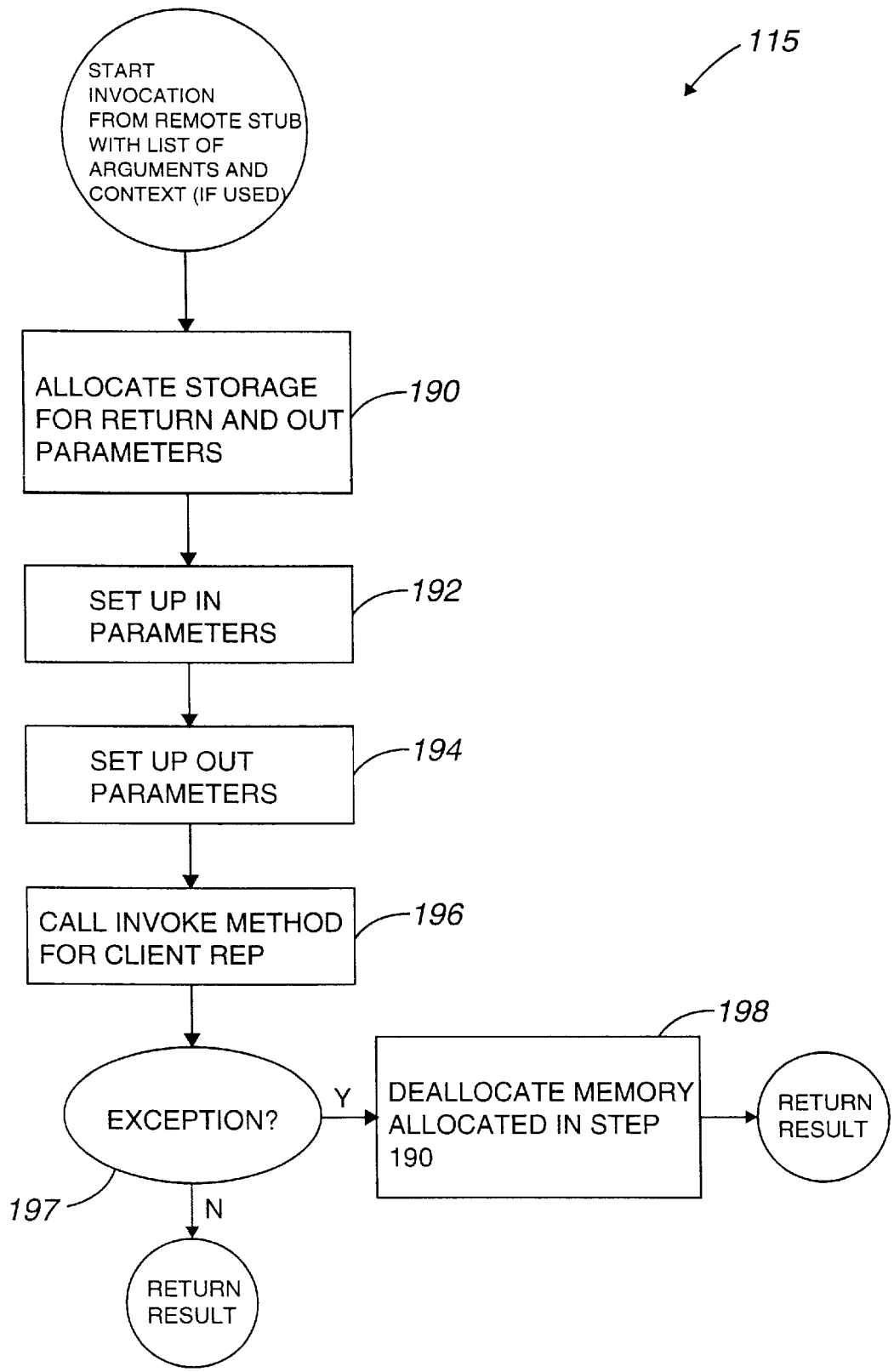
FIG. 3 is a process flow diagram which illustrates a method of executing a remote stub, i.e. step 115 of FIG. 2, in accordance with one embodiment of the present invention.

Referring next to FIG. 3, a method of executing a remote stub in accordance with one embodiment of the present invention will be described. That is, with reference to FIG. 2, step 115, the step of executing a remote stub, will be described in more detail. The start of invocation from a remote stub with a list of arguments and a context, if a context is used, begins at step 190 which is the allocation of storage, or memory, for return and out parameters, or parameters with a return processing direction and parameters with an out processing direction. A context is, in general, an array of associated strings containing information which is relevant to the method to be invoked. In some embodiments, as for example the C++ embodiment, in storage allocation step 190, storage is not allocated for parameters with an inout processing direction, as storage is preallocated by the caller for parameters with an inout processing direction. After storage is allocated, parameters with an in processing direction, i.e. in parameters, are set up in step 192. Each time an invoke method is called, the in parameters associated with arguments used in the invocation from the remote stub must be set up. Setting up in parameters entails building a parameter storage location descriptor pointed to by the IN_PARAM identified in the list of arguments used at the start of invocation from a remote stub. Parameter storage location descriptors contain pointers to memory locations where parameters reside. Parameter storage location descriptors and invocation descriptors, as well as method descriptors and exception storage descriptors, are described in co-pending U.S. patent application Ser. No. 08/673,181 filed concurrently herewith. After in parameters are set up, out parameters, as well as return parameters, are set up in step 194. That is, a parameter storage location descriptor containing pointers to out and return parameter storage locations is constructed. The method used to set up out parameters is analogous to the method used to set up in parameters.

From step 194, the step of setting up out parameters, process control moves to step 196 in which a call is made to the invoke method for the client representation. Each client representation has an associated invoke method. The steps involved with calling the invoke method for the client representation will be discussed below with reference to FIG. 4. In step 197, a determination is made regarding whether the call to the invoke method in step 196 has resulted in an exception. If it is determined that there has been an exception, process control proceeds to step 198 where the memory which was allocated for the storage of return and out parameters in step 190 is deallocated. Process control then returns the result of the call to the invoke method. If it is determined in step 197 that there has been no exception, process control simply returns the result of the call to the invoke method. In some embodiments, allocated memory may be released before the call returns. In other embodiments, allocated memory may be released immediately after the call returns.

Figure 4:
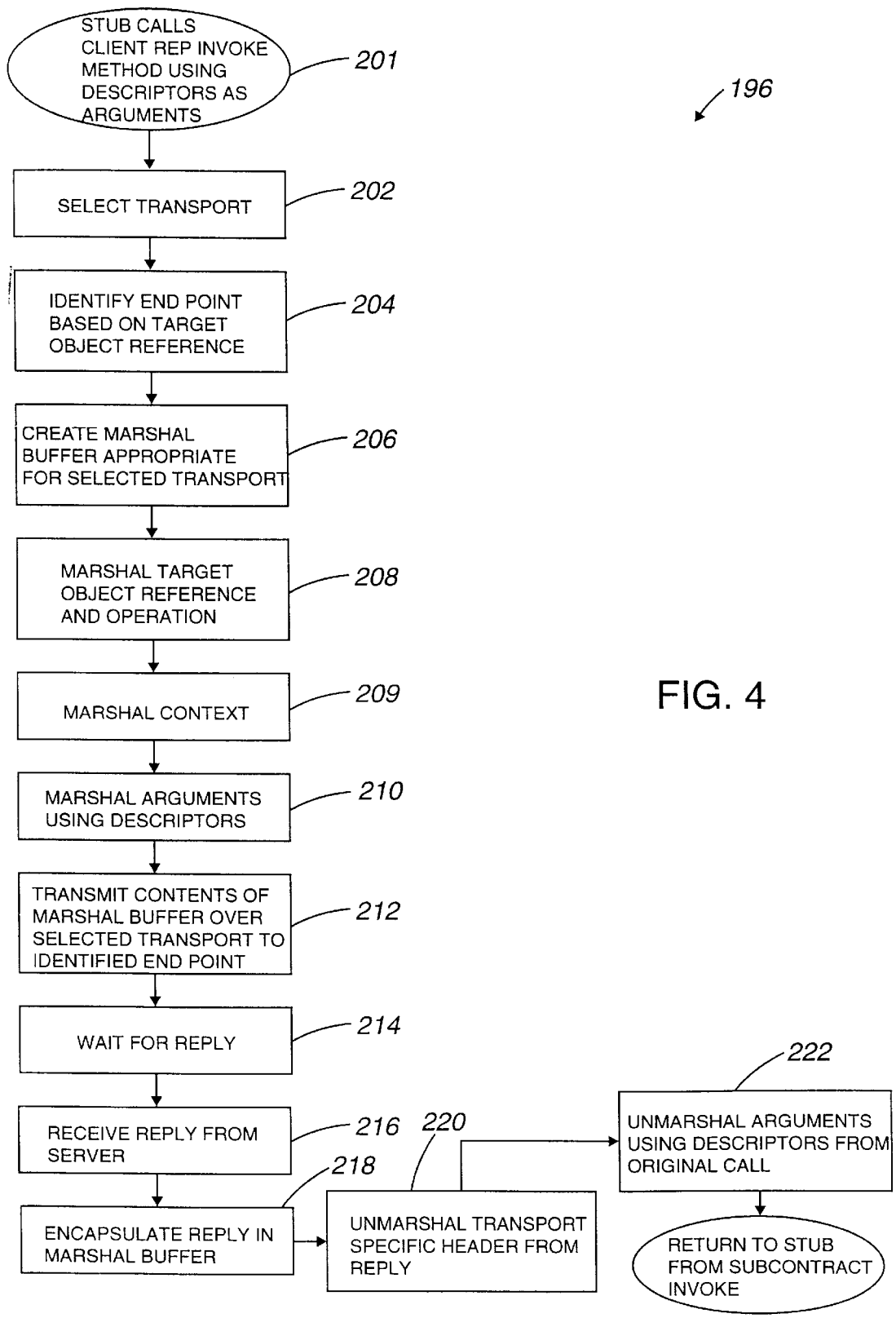
FIG. 4 is a process flow diagram which illustrates a method of calling an invoke method using a remote stub, i.e. step 196 of FIG. 3, in accordance with one embodiment of the present invention.

Referring next to FIG. 4, a method of calling the invoke method of a client representation using a remote stub in accordance with one embodiment of the present invention will be described. That is, with reference to FIG. 3, step 196, the step of calling an invoke method for the client representation, will be described in greater detail. The process begins at step 201 where the remote stub calls the invoke method of the client representation using descriptors, namely the method descriptor, the invocation descriptor, the parameter storage location descriptor or descriptors, and the exception descriptor, as arguments. In other words, the remote stub invokes an appropriate subcontract using descriptors as arguments. In step 202, a transport is selected. If a subcontract only supports one transport, that transport is selected. If the subcontract has multiple transports, metrics associated with the transports provide information which specifies the most appropriate transport to select. Once a transport has been selected, an end point is identified, based upon a target object reference, in step 204. An end point is a "porthole", or connection, which is used to receive invocations and send messages. The identification of an end point may either occur in the transport layer of a client or in the subcontract layer of the client. After an end point is identified, a marshal buffer appropriate for the transport selected in step 202 is created in step 206. The selection of a marshal buffer occurs in the transport layer of the client side. A marshal buffer is essentially a network buffer which encapsulates information which is to be transported, and has the capability of encoding atomic data suitable for transport. A marshal buffer has an identifier or tag which specifies the type of protocol data encoding it performs. That is, a marshal buffer is transport, or transport protocol, specific, as a transport usually implies a particular protocol which determines the type of data encoding performed by the marshal buffer. It should be appreciated that many transports may have the same protocol, and, therefore, use the same marshal buffer type. A subcontract is able to identify the marshal buffer appropriate for the selected transport by virtue of the identifier.

After the marshal buffer appropriate for the selected transport is created, in step 208, the target object reference and the operation, or method description, are marshaled. Only the portions of the target object reference which cannot be derived otherwise are marshaled in this step. Usually, only the object key is marshaled. In step 209, if a context is used, the context is marshaled. Only the information in the context which is of interest to the invoke method is picked out. From the step of marshaling the context, process control moves to step 210 where arguments are marshaled using descriptors. In the event that the object reference was passed as one of the arguments, it will be marshaled by the client representation associated with the target object reference. The process of marshaling argument object references will be described below with respect to FIG. 6. It should be appreciated that the order in which the context and the arguments are marshaled may be reversed. In some cases, when no context is used, step 209 may not occur at all, as there is clearly no need to marshal a context if a context is not used.

After the context and the arguments are marshaled, process control proceeds to step 212 where the contents of the marshal buffer are transmitted over the selected transport to the identified end point. For most selected transports, this step entails sending the contents in the marshal buffer over a wire. Transmission step 212 may be interpreted as the step of communicating from the client to the server. From transmission step 212, process control moves to step 214 where the client waits for a reply from the server. In a step 216, the client receives a reply from the server and encapsulates the reply in a marshal buffer. If the reply is larger than the request, a new marshal buffer may be created in order to encapsulate the reply. However, if the reply is not larger than the request, the marshal buffer created in step 206 may be used to encapsulate the reply in step 218.

Once the reply is encapsulated in a marshal buffer, a transport specific header is unmarshaled from the reply which is encapsulated in the marshal buffer in step 220. A transport specific header contains information which pertains to the transport selected in step 202. Other headers include headers which identify arguments and headers which specify request identifiers. A pointer associated with the marshal buffer may be used to determine the beginning and the end of a header which is being read. This pointer moves from byte to byte in the marshal buffer as data are decoded from the marshal buffer. After the transport specific header is unmarshaled from the reply, process control proceeds to step 222 where arguments are unmarshaled using descriptors from the original call. If the arguments include argument object references, the argument object references may be unmarshaled using information provided by an OUT_PARAM descriptor associated with the invocation descriptor. The unmarshaling of argument object references will be discussed below with respect to FIG. 7. After the arguments are unmarshaled using descriptors, the process returns to the remote stub.

The server side of a distributed object-oriented system responds to requests which are received on end points. Requests are typically transmitted as contents of a marshal buffer. The contents of a marshal buffer may be transmitted over a wire to an end point which receives the contents of the marshal buffer. As described above with respect to FIG. 1b, two types of end points are a dedicated end point and a cluster end point. A dedicated, or singular, end point is associated with a single subcontract. Hence, a dedicated end point always "knows" which subcontract to utilize. The functionality needed to create a dedicated end point is provided by the transport layer, whereas the dedicated end point itself is actually created by the subcontract layer. A cluster end point, on the other hand, may be used by more than one subcontract, and is created in the transport layer. The subcontract layer creates transport specific closures to be associated with the cluster end points. Closures are structures which include a pointer to a function and a pointer to a cookie, which is a pointer to a data element. An example of a cluster end point is a network or TCP/IP end point. In general, dedicated end points receive and process information faster than cluster end points as the use of dedicated end points requires less computation. As the use of dedicated end points may result in the use of more resources than desired for demultiplexing processes, however, cluster end points may be utilized in order to save resources.

Figure 5:
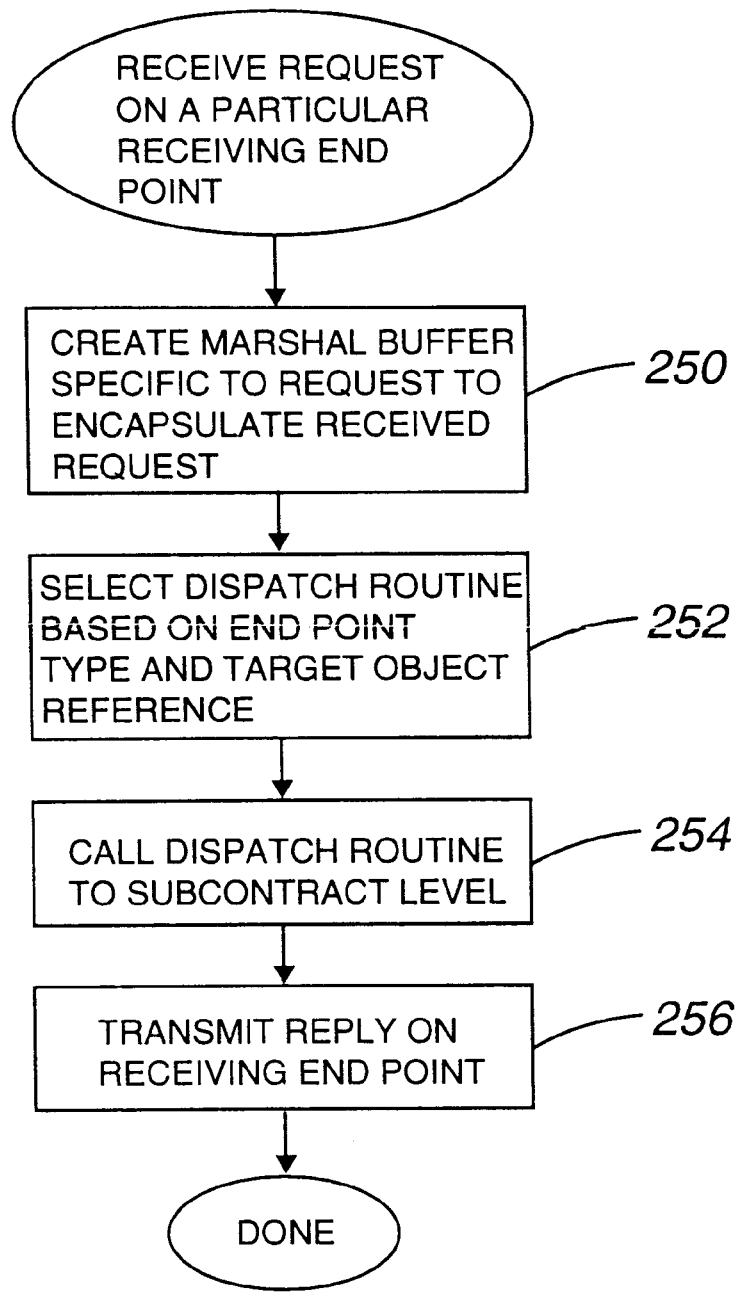
FIG. 5 is a process flow diagram which illustrates steps that occur on the server side of a distributed object-oriented system once a request is received on a receiving end point in accordance with one embodiment of the present invention.

Referring next to FIG. 5, a process flow diagram which illustrates steps that occur on the server side of a distributed object-oriented system once a request is received on a particular receiving end point in accordance with one embodiment of the present invention will be described. A marshal buffer specific to the request is created in step 250 in order to encapsulate the received request. The type of marshal buffer created is determined by the end point which is receiving the request. A subcontract level dispatch routine based upon the end point type and target object reference is selected in step 252. A subcontract level dispatch routine is also known as a transport-to-subcontract closure dispatch. The associated subcontract and transport may also be factors in the choice of a subcontract level dispatch routine. By way of example, the subcontract level dispatch routine may be selected through the use of an end point specific dispatch registry which associates subcontracts with closures, each of which contains a pointer to a subcontract level dispatch routine. The selection of a subcontract level dispatch routine is described in co-pending patent application Ser. No. 08/670,700 filed concurrently herewith. After a subcontract level dispatch routine is selected in step 252, process control moves to step 254 where the subcontract level dispatch routine selected in step 252 is called. The marshal buffer created in step 250 is passed, along with a "cookie", into the call to the subcontract level dispatch routine. A cookie is a pointer to a data element and is contained within a closure.

The subcontract level dispatch routine is both transport and subcontract specific. The subcontract level dispatch routine unmarshals the header of a request to determine the object and the method to be invoked. Typically, in order to determine the object, the object key must be unmarshaled from the request header. Other information, as for example transaction and security information, which may be required by the subcontract, may also be unmarshaled. A server invocation object appropriate for the subcontract contains information regarding the method to be invoked. Server invocation objects are described in co-pending application Ser. No. 08/673,181 filed concurrently herewith.

In addition to unmarshaling the header of a request, the subcontract level dispatch routine is also locates an appropriate skeleton dispatch closure using the object key unmarshaled from the header. The subcontract level dispatch routine invokes the method in the skeleton closure which executes the skeleton code for the invoked method. This skeleton method provides parameter typing information by setting the invocation descriptor pointer in the server invocation object. The invocation descriptor is associated with descriptors which describe in and out parameters used in an invocation.

The skeleton dispatch method invokes an unmarshal method on the server invocation object to unmarshal in parameters, using information provided in an associated parameter descriptor. It should be appreciated that some in parameters may be argument object references. After the unmarshal method is invoked to unmarshal in parameters, the called method of the servant object is invoked. If the called method of the servant object returns normally, i.e. there are no errors in the invocation of the called method, the called method invokes the marshal method of the server invocation object which then marshals any return parameters and out parameters specified in associated return and out parameter descriptors. Again, it should be appreciated that some of the return and out parameters may be argument object references. The skeleton dispatch method may return to the subcontract level dispatch routine which may then perform additional subcontract specific processing before returning to the caller.

Figure 6:
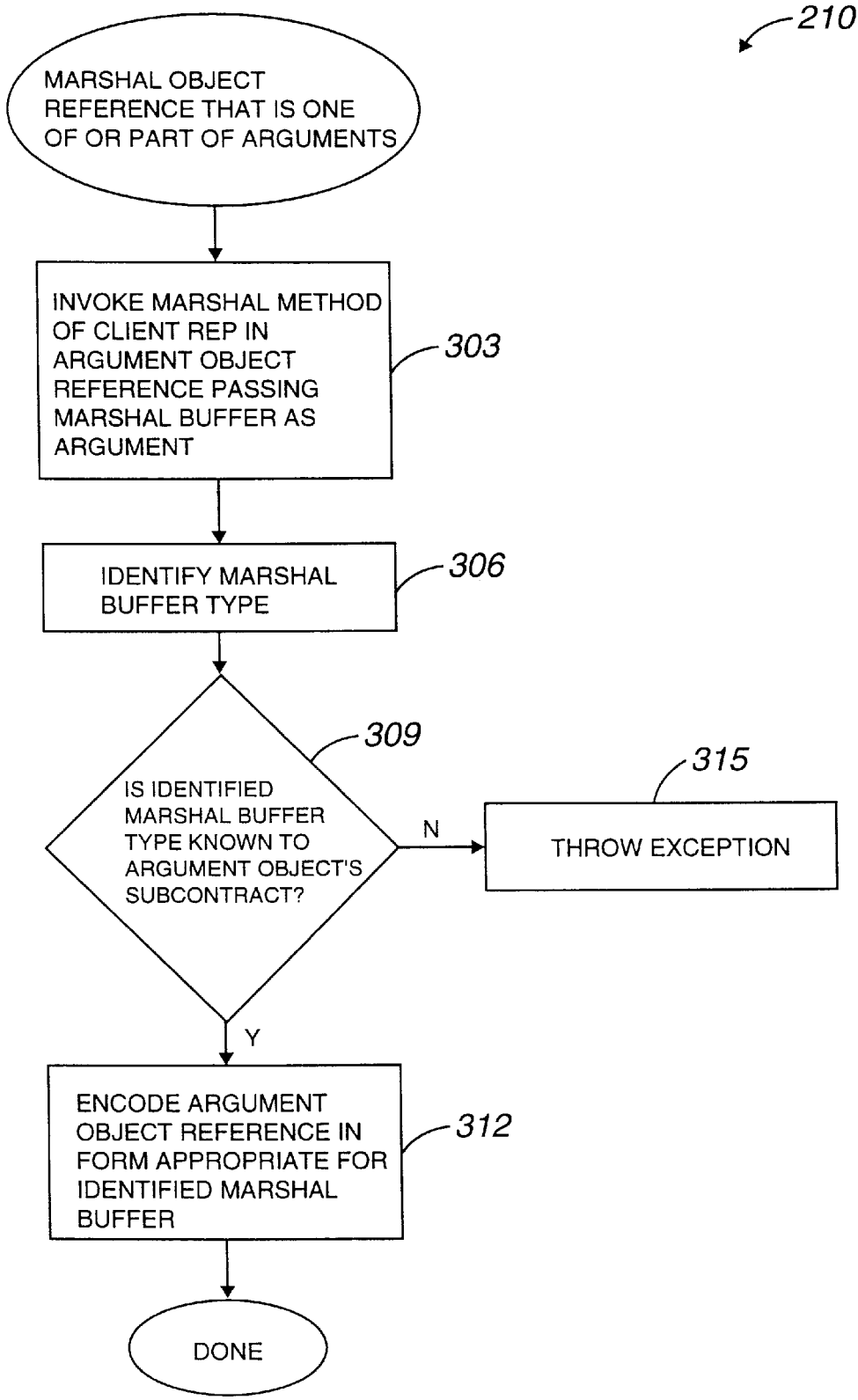
FIG. 6 is a process flow diagram which illustrates a method of marshaling argument object references, i.e. one case of step 210 of FIG. 4, in accordance with one embodiment of the present invention.

Referring next to FIG. 6, a method of marshaling argument object references, i.e. one case of step 210 of FIG. 4, in accordance with one embodiment of the present invention will be described. In this case, an object reference is a fat pointer, or a dual pointer with pointers to a method table (m-table) and a client representation, as discussed in co-pending application Ser. No. 08/670,684 filed concurrently herewith. In order to marshal an object reference that is one of or part of arguments in a call to an invoke method, the marshal method of the client representation in the argument object reference is called, with the marshal buffer passed as an argument in a step 303. The marshal method which is called is dependent upon the subcontract associated with the argument object reference due to the fact that the associated client representation is created using code which is specific to the subcontract of the servant object. Different client representations created by different subcontracts have different marshal methods, and each subcontract may encode different information in its marshaled object reference. Herein, the term "argument object reference" will be used to refer to object references that are arguments, whereas the term "target object reference" will be used to refer to object references which identify a target object to be invoked. Parameter descriptors, as well as other descriptor data structures, i.e. descriptors, which include method descriptors, invocation descriptors, and exception storage location descriptors, are described in co-pending patent application Ser. No. 08/673,181 filed concurrently herewith.

After the marshal method is invoked, the marshal buffer type is identified in step 306. A marshal buffer type may be identified by invoking an "id" method on the marshal buffer. An "id" method is used to obtain the marshal buffer type. After the marshal buffer type is identified, process control moves to step 309 where it is determined if the marshal buffer type identified in step 306 is a type which is known to the subcontract associated with the argument object reference. The marshal buffer type indicates both a supported protocol and a possible object reference encoding format. Typically, there are four or five types of marshal buffers. These types include, but are not limited to, Common Data Representation (CDR) type used for an Internet Interoperable Protocol (IIOP) transport and a door type, used for a door transport.

Subcontracts require certain information to be transmitted within each object reference. This information typically relates to the quality of service which relates to the subcontract. A subcontract must encode the information in an encoding format suitable for the transport protocol which is to be used to transmit the information to a different domain. Hence, a subcontract uses the marshal buffer type to determine the encoding format to be used to encode the information.

If the identified marshal buffer type is unknown, process flow moves to step 315 where an exception is thrown. The exception which is thrown may be returned in a location specified via the exception storage location descriptor. The exception indicates that it may not be possible to marshal the particular argument object reference. When the exception is thrown, no attempt is made to marshal the argument object reference. Hence, potential errors which would arise from an attempt to marshal an object reference which may not be marshaled are avoided. If it is determined in step 309 that the identified marshal buffer type is known to the subcontract associated with the argument object reference, the argument object reference is encoded in a form appropriate for the identified marshal buffer in step 312.

Encoding information in a format appropriate to a marshal buffer type allows an instance of the same marshal buffer type on the receiving domain to determine the subcontract, or, more specifically the subcontract identifier, associated with the argument object reference. The subcontract identifier is used to select an appropriate subcontract specific unmarshal routine to decode, i.e. unmarshal, the information encoded by the marshal routine. As different subcontracts may encode different information into the same marshal buffer, it follows that subcontracts perform the unmarshaling to extract the information. It should be appreciated that each subcontract encodes information using a set of well-known encoding formats such that the marshal buffer can find the subcontract identifier in the encoded object reference. The encoding formats are determined from protocols supported by the marshal buffer, whereas the subcontract determines the information that is actually encoded.

Figure 7:
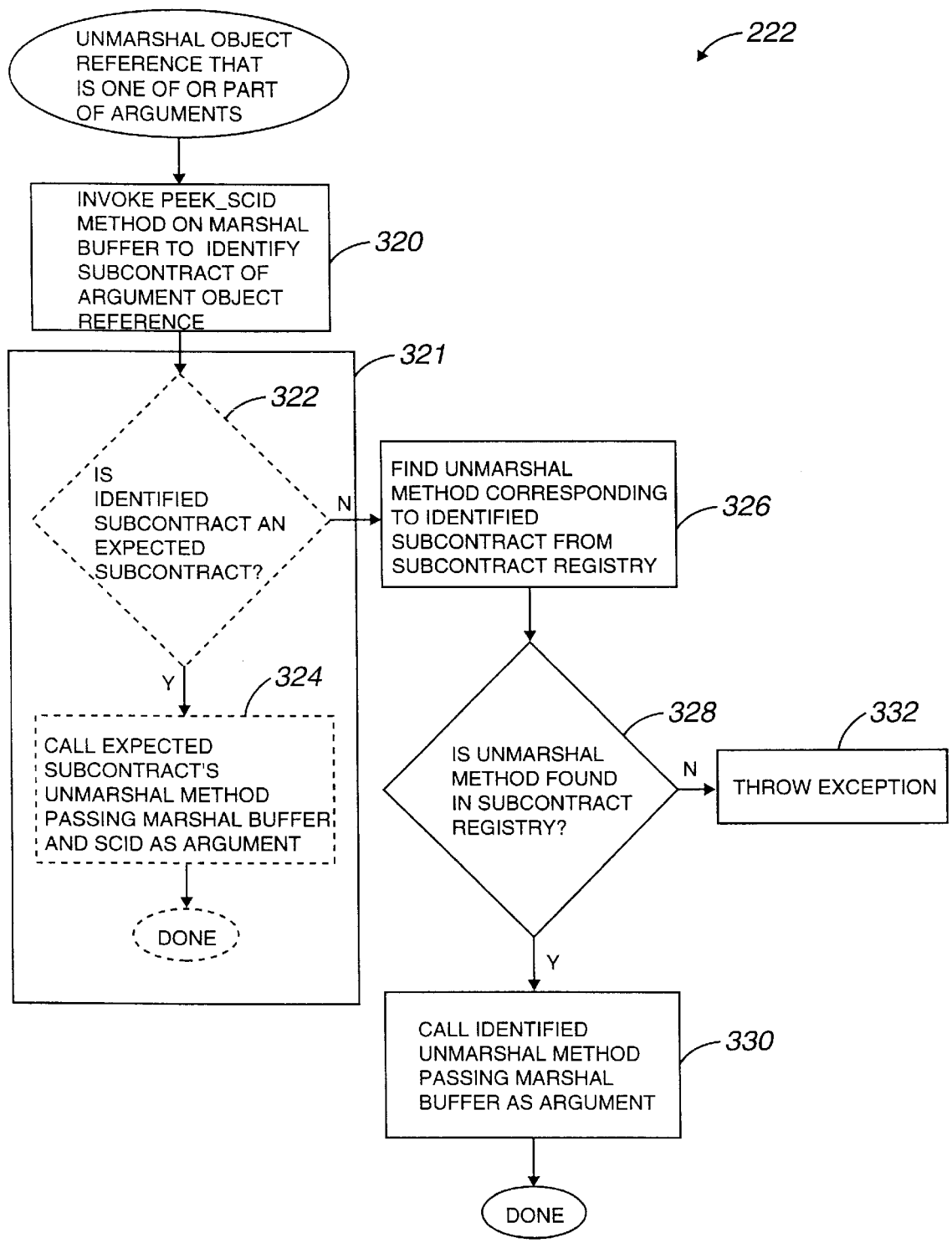
FIG. 7 is a process flow diagram which illustrates a method of unmarshaling an argument object reference, i.e. one case of step 222 of FIG. 4, in accordance with one embodiment of the present invention.

Referring next to FIG. 7, a method of unmarshaling an object reference that is one of or part of arguments to an invoked method in accordance with one embodiment of the present invention will be described. That is, the case of unmarshaling arguments which are object references as a part of step 222 of FIG. 4 will be discussed. The process of unmarshaling an object reference that is one of or part of arguments begins at step 320, in which a peek method, or more specifically a PEEK_SCID method, is invoked on the marshal buffer to identify the subcontract associated with the argument object reference. Each marshal buffer has an associated PEEK_SCID method, or function, which is specific to the marshal buffer type. Hence, since the marshal buffer type is dependent upon the mode of transport, or protocol, selected in step 202 of FIG. 4, it follows that the PEEK_SCID method is also dependent upon the mode of transport used. The subcontract of the argument object reference is determined when the subcontract identifier (SCID) is read from the marshal buffer using the PEEK_SCID method associated with the marshal buffer. In general, the PEEK_SCID method determines the subcontract identifier for an object reference by looking at, or reading, the first four bytes of the object key of the object reference encapsulated in the marshal buffer. The object key of the object reference is such that the first four bytes of the object key will typically contain the subcontract identifier. However, the location of the object key within an encoded object reference, i.e. an object reference encapsulated in a marshal buffer, may vary depending on the protocol or transport used. Marshal buffers "know" how to locate an object key in an object reference, regardless of where the object key is located within the object reference.

After a subcontract is identified, process control may proceed to step 322, which is the determination of whether the identified subcontract is an expected subcontract. An expected subcontract is compiled into application code at start-up, and may be considered to be a "default" subcontract which is expected for the particular argument object reference. If the identified subcontract is the expected subcontract, the unmarshal method of the expected subcontract is called in step 324, passing the marshal buffer and the corresponding subcontract identifier as arguments. Then, the process of unmarshaling an object reference that is one of or part of arguments to an invoke method is completed. If, on the other hand, it is determined in step 322 that the identified subcontract is not an expected subcontract, a search is made for the unmarshal method which corresponds to the identified subcontract from the subcontract registry in step 326. The subcontract identifier, which was located by the PEEK_SCID method in step 320, is used as the key to locate the appropriate unmarshal method in a subcontract registry. Subcontract registries will be discussed below with respect to FIG. 9. A complete discussion of subcontract registries may be found in co-pending application Ser. No. 08/669,782 filed concurrently herewith.

The step of determining whether an identified subcontract is an expected subcontract and the step of calling the unmarshal method of the expected subcontract if it is determined that the identified subcontract is an expected subcontract make up an optional step 321. The use of expected subcontracts is intended to eliminate the need to search for an unmarshal method which corresponds to an identified subcontract, in the event that an identified subcontract is an expected subcontract. If an identified subcontract is an expected subcontract, then the unmarshal method of the identified subcontract is known. In some embodiments, however, the comparison of an identified subcontract with an expected subcontract and the use of the expected subcontract in step 321 may be eliminated. If the use of an expected subcontract is eliminated, process flow moves directly from the step of identifying a subcontract to step 326, where a subcontract registry is used to find the unmarshal method which corresponds to the identified subcontract.

After a search for an appropriate unmarshal method in a subcontract registry, process control proceeds to step 328 where it is determined if an unmarshal method which corresponds to the identified subcontract was found in the subcontract registry. If the determination is affirmative, i.e. an appropriate unmarshal method has been found, the identified unmarshal method is called, with the marshal buffer as an argument, in step 330. It should be appreciated that different subcontracts have different unmarshal methods due to the fact that each subcontract encodes information depending upon the particular quality of service it provides. An embodiment of a subcontract specific unmarshal routine will be described below with reference to FIG. 8. After the call to the unmarshal method, the process of unmarshaling an argument object reference is completed. On the other hand, if it is determined in step 328 that a suitable unmarshal method was not found in the subcontract registry, an exception may be thrown in step 332. The exception may be returned in storage location specified by an exception storage location descriptor which is associated with the original call to an invoke method.

Figure 8:
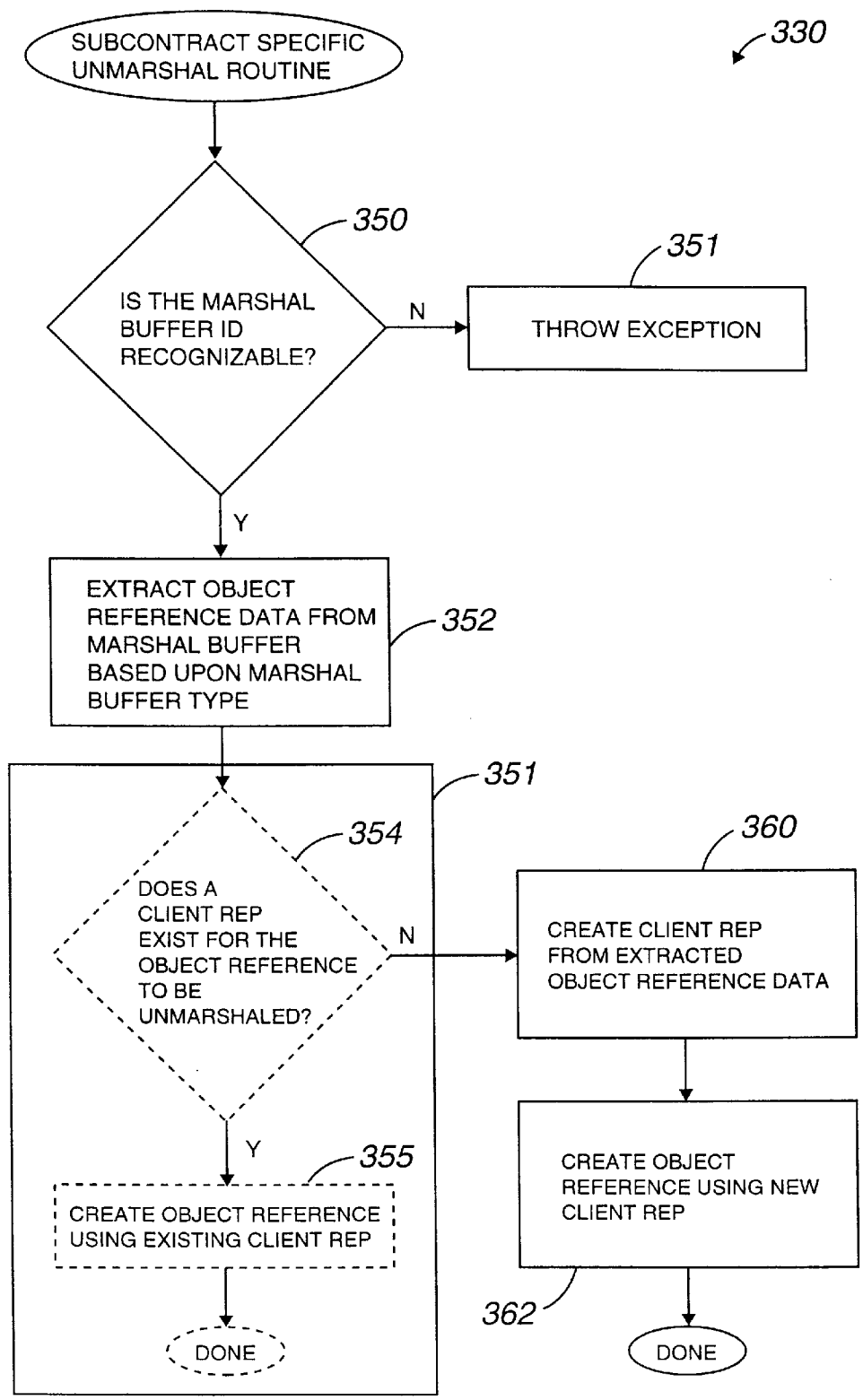
FIG. 8 is a process flow diagram which illustrates a method of implementing a subcontract specific unmarshal routine to create an object reference, i.e. step 330 of FIG. 7, in accordance with one embodiment of the present invention.

Referring next to FIG. 8, a method of implementing a subcontract specific unmarshal routine to create an object reference, i.e., fat pointer or CORBA object reference, in accordance with one embodiment of the present invention will be described. That is, the call to the unmarshal method in step 330 of FIG. 7 will be described. The process begins at step 350 with the determination of whether the marshal buffer identifier (ID) may be recognized by the subcontract specific unmarshal routine that is to be implemented. If it is determined that the marshal buffer ID is not recognizable, an exception is thrown in step 351. The fact that the marshal buffer ID is not recognizable indicates that the subcontract does not have knowledge regarding how to decode required information using the encoding format of the marshal buffer. If it is determined that the marshal buffer ID is recognizable, process control proceeds to step 352 where object reference data is extracted from the marshal buffer. The object reference data, or, specifically, argument object reference data, which is extracted is based upon the marshal buffer type. That is, the marshal buffer type dictates the type of object reference data which is to be extracted and, more importantly, the manner in which required information is extracted from a given encoding format.

After argument object reference data is extracted, process control may proceed to step 354 where it is determined if a client representation exists for the object reference to be unmarshaled. As client representations may be associated with more than one object reference, it is possible that client representation which already exists may be suitable for the object reference to be unmarshaled. It should be appreciated that client representations differ depending upon the subcontract with which it is associated. That is, as client representations may be used to determine how object references are marshaled, client representations therefore vary according to the quality of service provided and, hence, the associated subcontract. If the determination is that a client representation exists for the object reference to be unmarshaled, an object reference is created in step 355 using the already existing client representation. After the object reference is created, the process of implementing a subcontract specific unmarshal routine is complete. If the determination in step 354 is that a client representation does not exist for the object reference to be unmarshaled, process control proceeds to step 360 where a client representation is created from the extracted object reference data. After a new client representation is created, an object reference is created using the new client representation in step 362. After step 362, the process of implementing a subcontract specific unmarshal routine is complete.

Alternatively, the steps of searching for an existing client representation and creating an object reference using the existing client representation, i.e. steps 354 and 355, which comprise an overall step 351, may be eliminated. The purpose of searching for and using an existing client representation in overall step 351 is to eliminate the step of creating a client representation from extracted object reference data in the event that a suitable client representation is already in existence. Although searching for and using existing client representations, if they are available, eliminates the creation of "extra" client representations, some embodiments may not include a search for existing client representations. If the search for and use of client representations in not included, i.e. if step 351 is eliminated, after object reference data is extracted form the marshal buffer in step 352, process control proceeds to step 360 where a client representation is created from the extracted object reference data. Then, in step 362, an object reference is created using the new client representation, and the process of implementing a subcontract specific unmarshal routine is complete.

On the server side of a client-server system, the selection of an appropriate dispatch routine for use in dispatching a request received on an end point to a subcontract may be accomplished through the use of an end point specific dispatch registry. As mentioned above with respect to FIG. 5, an end point specific dispatch registry, or end point registry, associates subcontracts with closures which contain pointers to the dispatch routines which used to dispatch requests to an appropriate subcontract. In general, an end point registry may be thought of as a listing of closures which are indexed using the subcontracts with which each closure is associated. End point specific dispatch registries are described in more detail in co-pending U.S. patent application Ser. No. 08/670,700 filed concurrently herewith.

Figure 9:
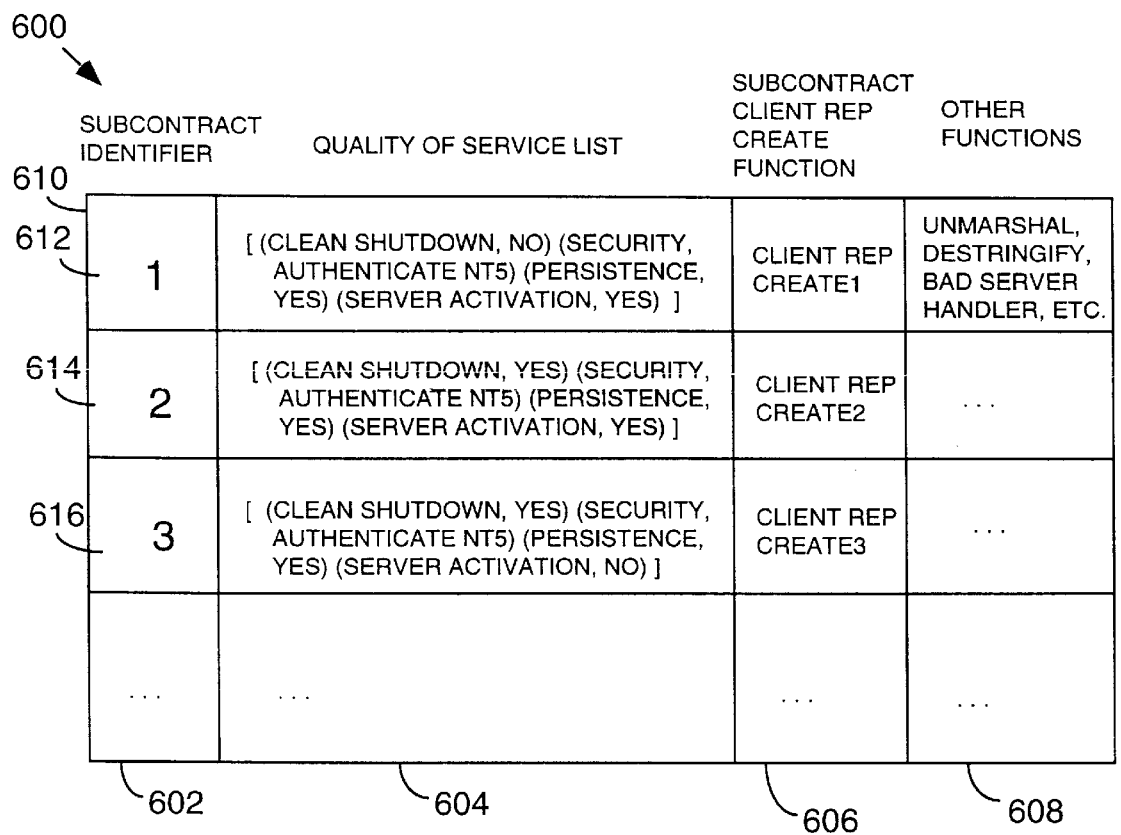
FIG. 9 is a diagrammatic representation of a subcontract registry in accordance with one embodiment of the present invention.

As previously mentioned with respect to FIG. 7, a subcontract registry may be used to select the appropriate unmarshal function to use in order to unmarshal an object reference, given a subcontract identifier. FIG. 9 is a diagrammatic representation of a subcontract registry data structure 600 in accordance with one embodiment of the present invention. Subcontract registry data structure 600, or, simply, subcontract registry 600, stores information that associates a particular quality of service with a unique subcontract identifier and with a subcontract client representation create function. Subcontract registry 600 registers information pertaining to subcontracts in a tabular form, and makes available subcontracts within a system available for searching. The tabular form is advantageous in that it allows any number of implementations to be associated with a particular subcontract, as is discussed in co-pending patent application Ser. No. 08/670,684 filed concurrently herewith. It should be appreciated that although a predetermined number of permutations of features within a system are possible, subcontract registry 600 may identify only a subset of these possible subcontracts that have been implemented within the distributed object system. Subcontract registry 600 may be implemented as a hash table, linked list or any other suitable data structure.

Subcontract registry 600 includes a subcontract identifier (SCID) column 602, an associated quality of service list column 604, a subcontract client representation create function column 606, and pointers to other functions 608. Each row 610 of subcontract registry 600 is termed a subcontract meta object and, by way of example, may be implemented as a C++ object. In the embodiment shown, a plurality of subcontract meta objects 612, 614 and 616 are provided in subcontract registry 600. The first subcontract meta object 212 has a subcontract identifier of "1" and will herein be identified as Subcontract 1. Subcontract 1 lists the following features for its quality of service: clean shutdown, security, persistence and server activation. The name-value pairs in this quality of service list indicate that a clean shutdown will not be implemented, an authentication protocol using MD5 will be used for security, and persistence is turned on. Subcontract 1 has a pointer to its associated subcontract client representation create function, client representation create 1, in subcontract client representation create function column 606. A plurality of pointers to various other functions associated with each subcontract meta object in other function column 608 include pointers to an unmarshal function, a destringify function, and a bad server identifier handler.

The second subcontract meta object 614 shown in subcontract registry 600 is the subcontract meta object associated with the subcontract identified as subcontract 2. The quality of service list for this subcontract indicates that server activation is present. The third subcontract meta object 216 indicates that the subcontract identified as subcontract 3 will allow for transactions, clean shutdowns, and server activation.

Subcontract registry 600 will typically have a group of associated functions that are used to organize and access the registry. By way of example, the associated functions may include an Add function, a Find function, a Get_First function and a Get_Next function. The Add function may be used to add a new quality of service to the table. In the described embodiment, the Add function takes as arguments a subcontract identifier and a subcontract meta object. A Find function takes a subcontract identifier as an argument and returns the subcontract meta object associated with that identifier. The functions Get_First and Get_Next are used to iterate over a subcontract registry, as for example subcontract registry 600, thereby searching it completely for a particular quality of service, and returning the appropriate meta object. When a client wishes to make a call to a particular server object, subcontract registry 600 may be used to look up the subcontract identifier associated with that server object. Once the appropriate subcontract identifier has been located, the appropriate subcontract client representation create function is called in order to create a client representation that may be referenced by an object reference.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 10:
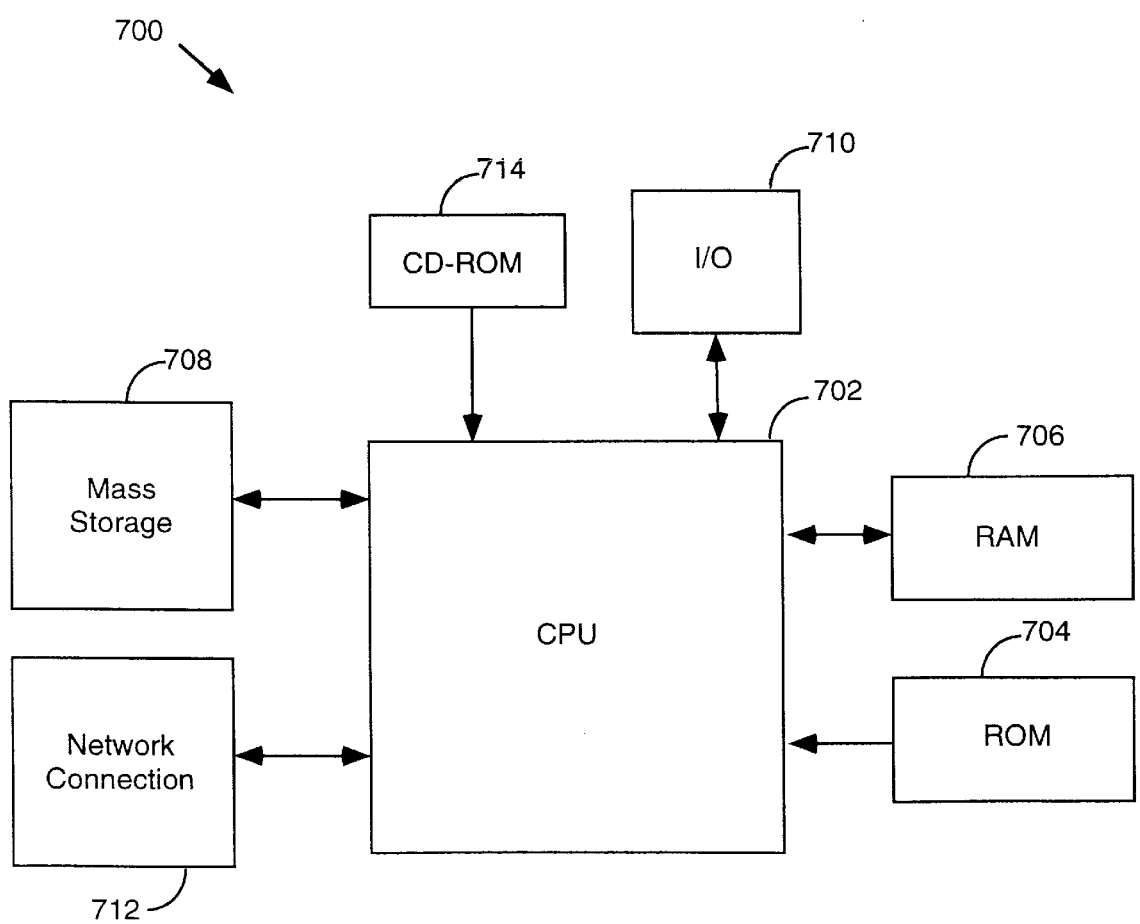
FIG. 10 illustrates a typical computer system in accordance with one embodiment of the present invention.

FIG. 10 illustrates a typical computer system in accordance with the present invention. The computer system 700 includes a processor 702 (typically referred to as a central processing unit, or CPU) that is coupled to memory devices including primary storage device 704 (typically a read only memory, or ROM) and primary storage device 706 (typically a random access memory, or RAM). As is well known in the art, ROM 704 acts to transfer data and instructions unidirectionally to the CPU and RAM 706 is used typically to transfer data and instructions in a bi-directional manner. A mass memory device 708 is also coupled bi-directionally to CPU 702 and provides additional data storage capacity. Mass memory device 708 may be used to store programs, data and the like and and is typically a secondary storage medium such as a hard disk that is slower than primary storage devices 504, 506. Mass memory device 708 may take the form of a magnetic or paper tape reader or some other well-known device. It will be appreciated that the information retained within mass memory device 708, may, in appropriate cases, be incorporated in standard fashion as part of RAM 706 as virtual memory. A specific mass storage device such as a CD-ROM 714 may also pass data unidirectionally to the CPU.

CPU 702 is also coupled to one or more input/output devices 710 that may include, but are not limited to, devices such as video monitors, track balls, mice, keyboards, microphones, touch-sensitive displays, transducer card readers, magnetic or paper tape readers, tablets, styluses, voice or handwriting recognizers, or other wellknown input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

Although only one preferred embodiment of the present invention has been described, it should be understood that the present invention may be embodied in many other specific forms without departing from the spirit or the scope of the present invention. In the described embodiment, a subcontract registry has been described. It will be apparent that the subcontract registry can be widely varied within the scope of the present invention. Further, steps involved with methods of marshaling and unmarshaling argument object references may be reordered. Steps may also be removed or added without departing from the spirit or the scope of the present invention.

Additionally, in some situations, marshal and unmarshal methods associated with a common object may be combined into a single method. For instances in which the marshal and unmarshal methods are identical, the addition of an argument in the function call could be used to specify whether marshaling or unmarshaling is desired. For instances in which the marshal and unmarshal methods are distinct, a new function could be created to perform both methods. This new function could include an argument to the function call which would specify whether the method desired was marshaling or unmarshaling. If a single function represents both marshaling and unmarshaling, in typecode and descriptor data structures with pointers to marshal and unmarshal methods, one pointer may be used to point to the single function. A boolean value or a flag may be implemented into the descriptor data structures which would indicate whether marshaling or unmarshaling is desired by the descriptor data structure. Therefore the described embodiments should be taken as illustrative and not restrictive, and the invention should be defined by the following claims and their full scope of equivalents.

We claim:

1. A method of unmarshaling an argument object reference that is at least a part of an argument in an invocation request encapsulated within a marshal buffer, the argument object reference including a subcontract identifier, the method comprising the steps of:
   a) identifying a subcontract associated with the argument object reference by reading the subcontract identifier in the argument object reference, wherein the subcontract identifying step is accomplished by the marshal buffer;
   b) accessing a subcontract registry using the subcontract identifier as a key to identify an unmarshal method associated with the identified subcontract, the subcontract registry accessing step being accomplished by the subcontract identified by the subcontract identifier; and
   c) calling the identified unmarshal method associated with the identified subcontract passing the marshal buffer as an argument to the call, wherein the identified unmarshal method unmarshals the argument object reference.

2. A method as recited in claim 1 further comprising the step of determining whether the identified subcontract identifier is the same as an expected subcontract identifier, wherein:
   when it is determined that the identified subcontract identifier is not the same as the expected subcontract identifier, steps (b) and (c) are performed; and
   when it is determined that the identified subcontract identifier is the same as the expected subcontract identifier, steps (b) and (c) are not performed and the method further comprises the step of calling an expected unmarshal method that corresponds to the expected subcontract identifier, wherein the expected unmarshal method is called passing the marshal buffer as an argument to the call.

3. A method as recited in claim 1 wherein the step of identifying the subcontract identifier is accomplished by invoking a peek method on the marshal buffer.

4. A method as recited in claim 1 wherein the object reference further includes a server identifier, an implementation identifier, and a user key.

5. A method as recited in claim 3 wherein the peek method is specific to the marshal buffer, the peek method being arranged to identify the subcontract identifier by reading bytes associated with an object key of the argument object reference.

6. A computer readable medium having programmed instructions for unmarshaling an argument object reference that is at least a part of an argument encapsulated within a marshal buffer, the argument object reference including a subcontract identifier, the computer readable medium having programmed instructions arranged to:
   a) identify a subcontract associated with the argument object reference by reading the subcontract identifier in the argument object reference, wherein the subcontract identifying step is accomplished by programmed instructions associated with the marshal buffer;
   b) access a subcontract registry using the subcontract identifier as a key to identify an unmarshal method associated with the identified subcontract, the subcontract registry accessing step being accomplished by programmed instructions associated with the subcontract identified using the subcontract identifier; and
   c) call the identified unmarshal method associated with the identified subcontract passing the marshal buffer as an argument to the call, wherein the identified unmarshal method includes programmed instructions arranged to unmarshal the argument object reference.

7. A computer readable medium as recited in claim 6 further comprising programmed instructions for:
   determining whether the identified subcontract identifier is the same as an expected subcontract identifier, the programmed instructions further being arranged to perform steps (b) and (c) when it is determined that the identified subcontract identifier is not the same as the expected subcontract identifier, and not perform steps (b) and (c) when it is determined that the identified subcontract identifier is the same as the expected subcontract identifier; and
   calling an expected unmarshal method that corresponds to the expected subcontract identifier when it is determined that the identified subcontract identifier is the same as the expected subcontract identifier, wherein the programmed instructions are further arranged to pass the marshal buffer an argument to the call to the expected unmarshal method.

8. An argument object reference unmarshaler for use in a distributed, client server computing system, the argument object reference unmarshaler comprising:
   a marshal buffer for receiving a distributed request that includes an argument object reference, the argument object reference having a subcontract identifier;

a peeking mechanism associated with the marshal buffer that peeks at the subcontract identifier associated with the argument object reference, the peeking mechanism being arranged to make an unmarshaling request call to a subcontract associated with the subcontract identifier;

a subcontract registry having entries corresponding to a plurality of different subcontracts, the subcontract registry being arranged to identify an unmarshal method associated with each different subcontract;

a subcontract registry searching mechanism associated with the subcontract, the subcontract registry searching mechanism being arranged to search the subcontract registry using the subcontract identifier found by the peeking mechanism as a key to identify the unmarshal method associated with the argument object reference; and a call dispatcher for calling the identified unmarshal method passing the marshal buffer as an argument to the call, whereby the identified unmarshal method unmarshals the argument object reference.

9. A method of unmarshaling an argument object reference that is at least a part of an argument in an invocation request encapsulated within a marshal buffer, the argument object reference including a subcontract identifier, the method comprising:

identifying a subcontract associated with the argument object reference by reading the subcontract identifier in the argument object reference, wherein the subcontract identifying is accomplished by the marshal buffer using a reading function that is specific to the marshal buffer, the subcontract identifier being associated with an object key of the argument object reference;

determining whether the identified subcontract identifier is the same as an expected subcontract identifier;

when it is determined that the identified subcontract identifier is the same as the expected subcontract identifier, calling an expected unmarshal method that corresponds to the expected subcontract identifier, the expected unmarshal method calling being accomplished by the subcontract identified by the subcontract identifier, wherein the expected unmarshal method is called passing the marshal buffer and the identified subcontract identifier as arguments; and when it is determined that the identified subcontract identifier is not the same as the expected subcontract identifier, using the identified subcontract identifier as an index into a registry to locate a suitable unmarshal method for unmarshaling the argument object reference.

10. A computer program product comprising a computer-usable medium having computer-readable code embodied thereon for unmarshaling an argument object reference that is at least a part of an argument in an invocation request encapsulated within a buffer, the argument object reference including a subcontract identifier, the argument object reference defined within a distributed client/server based computer system, the computer program comprising computer-readable program code for effecting the following steps within the computer system:

a) identifying a subcontract associated with the argument object reference by reading the subcontract identifier in the argument object reference, wherein the subcontract identifying step is accomplished by the marshal buffer;

b) accessing a subcontract registry using the subcontract identifier as a key to identify an unmarshal method associated with the identified subcontract, the subcontract registry accessing step being accomplished by the subcontract identified by the subcontract identifier; and c) calling the identified unmarshal method associated with the identified subcontract passing the marshal buffer as an argument to the call, wherein the identified unmarshal method unmarshals the argument object reference.

11. A computer program product comprising computer-readable program code as recited in claim 10 further effecting the step of determining whether the identified subcontract identifier is the same as an expected subcontract identifier, wherein:

when it is determined that the identified subcontract identifier is not the same as the expected subcontract identifier, steps (b) and (c) are performed; and when it is determined that the identified subcontract identifier is the same as the expected subcontract identifier, steps (b) and (c) are not performed and the method further comprises the step of calling an expected unmarshal method that corresponds to the expected subcontract identifier.

12. A computer program product comprising computer-readable program code as recited in claim 10 wherein the step of identifying the subcontract identifier is accomplished by invoking a peek method on the marshal buffer.

13. A computer program product comprising computer-readable program code as recited in claim 10 wherein the object reference further includes a server identifier, an implementation identifier, and a user key.

14. A computer program product comprising a computer-usable medium having computer-readable code embodied thereon for unmarshaling an argument object reference that is at least a part of an argument in an invocation request encapsulated within a marshal buffer, the argument object reference including a subcontract identifier, the argument object reference defined within a distributed client/server based computer system, the computer program product comprising computer-readable code for effecting the following steps within the computer system:

identifying a subcontract associated with the argument object reference by reading the subcontract identifier in the argument object reference, wherein the subcontract identifying step is accomplished by the marshal buffer using a reading function that is specific to the marshal buffer, the subcontract identifier being associated with an object key of the argument object reference;

determining whether the identified subcontract identifier is the same as an expected subcontract identifier;

when it is determined that the identified subcontract identifier is the same as the expected subcontract identifier, calling an expected unmarshal method that corresponds to the expected subcontract identifier, the expected unmarshal method calling being accomplished by the subcontract identified by the subcontract identifier, wherein the expected unmarshal method is called passing the marshal buffer and the identified subcontract identifier as arguments; and when it is determined that the identified subcontract identifier is not the same as the expected subcontract identifier, using the identified subcontract identifier as an index into a registry to locate a suitable unmarshal method for unmarshaling the argument object reference.

15. A computer-implemented method for performing an invocation associated with a client representation, the client representation being associated with a distributed, client server computing system, the computer-implemented method comprising:

invoking a first subcontract, the first subcontract being associated with the client representation;

determining a transport, the transport being associated with the first subcontract;

creating a marshal buffer, the marshal buffer being associated with the transport;

marshaling a first set of information, wherein the first set of information is marshaled into the marshal buffer as contents of the marshal buffer;

transmitting the contents of the marshal buffer over the transport to an end point associated with a server;

receiving a second set of information from the server;

encapsulating the second set of information from the server in the marshal buffer; and unmarshaling at least some of the second set of information from the marshal buffer, wherein the second set of information includes an argument object reference, the unmarshaling including unmarshaling the argument object reference.

16. A computer-implemented method as recited in claim 15 wherein unmarshaling includes:

identifying a second subcontract by reading a subcontract identifier associated with the argument object reference, the second subcontract being associated with the argument object reference, wherein identifying the second subcontract is accomplished by the marshal buffer;

accessing a registry using the subcontract identifier as a key to identify an unmarshal method associated with the identified second subcontract, the registry accessing being accomplished by the second subcontract; and calling the identified unmarshal method associated with the identified second subcontract passing the marshal buffer as an argument to the call, wherein the identified unmarshal method unmarshals the argument object reference.

\* \* \* \* \*